US010873279B2

(12) United States Patent
Ahnert et al.

(10) Patent No.: US 10,873,279 B2
(45) Date of Patent: Dec. 22, 2020

(54) MOTOR STARTER AND DIAGNOSIS METHOD

(71) Applicant: SIEMENS AKTIENGESELLSCHAFT, Munich (DE)

(72) Inventors: Karsten Ahnert, Chemnitz (DE); Gernot-Dirk Almen, Erlangen (DE); Norbert Fiedler, Chemnitz (DE); Bernd Flor, Feuchtwangen (DE); Franz Nagy, Wilhermsdorf (DE); Nico Wohlrab, Großolbersdorf (DE); Albrecht Wolf, Grüna (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 32 days.

(21) Appl. No.: 16/077,820

(22) PCT Filed: Feb. 3, 2017

(86) PCT No.: PCT/EP2017/052324
§ 371 (c)(1),
(2) Date: Aug. 14, 2018

(87) PCT Pub. No.: WO2017/153098
PCT Pub. Date: Sep. 14, 2017

(65) Prior Publication Data
US 2019/0115855 A1    Apr. 18, 2019

(30) Foreign Application Priority Data

Mar. 8, 2016  (DE) .................. 10 2016 203 755

(51) Int. Cl.
H02P 1/28      (2006.01)
H02P 1/26      (2006.01)
(Continued)

(52) U.S. Cl.
CPC .................. *H02P 1/26* (2013.01); *G05B 9/02* (2013.01); *H01H 9/54* (2013.01); *H02H 9/001* (2013.01);
(Continued)

(58) Field of Classification Search
CPC ........... G05B 9/02; H02H 9/001; H02P 1/023; H02P 1/04; H02P 1/26; H02P 29/0241; H02P 29/027
See application file for complete search history.

(56) References Cited

U.S. PATENT DOCUMENTS 4,142,136 A     2/1979  Witter
5,452,201 A *   9/1995  Pieronek ............ G05B 19/0421
                                                    700/83
(Continued)

FOREIGN PATENT DOCUMENTS

CN  104660107 A   5/2015
DE  4008002 A1    9/1991
(Continued)

OTHER PUBLICATIONS

German Office Action for German Application No. 102016203755.2, dated Jan. 25, 2017.
(Continued)

*Primary Examiner* — Muhammad S Islam
(74) *Attorney, Agent, or Firm* — Lempia Summerfield Katz LLC

(57) ABSTRACT

The invention relates to a motor starter (10) for an electric motor (20), wherein the motor starter (10) comprises a first and a second phase (12, 14). Said motor starter and electric motor each have an associated switching apparatus (29, 31) which each have an electromechanical switch (22, 24) and a semiconductor switch (23, 25) connected to form a bypass circuit. The electromechanical switches (22, 24) and the
(Continued)

semiconductor switches (23, 25) are designed to be separately operable by a control unit (40), and the first and the second phase (12, 14) are connected to a passive overcurrent protection means (30). The passive overcurrent protection means (30) has a fuse (32, 34, 36) for each phase. According to the invention, a measuring apparatus (42, 44) is arranged in at least one of the phases (12, 14) along the phase direction directly between the passive overcurrent protection means (30) and at least one of the switching apparatuses (29, 31). The invention further relates to diagnosis methods (100, 200, 300) with which defects in the motor starter (10) can be diagnosed during an activation sequence.

15 Claims, 4 Drawing Sheets

(51) Int. Cl.

| | | |
|---|---|---|
| *H02H 9/00* | (2006.01) | |
| *H02P 1/02* | (2006.01) | |
| *H02P 29/024* | (2016.01) | |
| *G05B 9/02* | (2006.01) | |
| *H01H 9/54* | (2006.01) | |
| *H02P 1/04* | (2006.01) | |

(52) U.S. Cl.
CPC ............... *H02P 1/023* (2013.01); *H02P 1/04* (2013.01); *H02P 29/027* (2013.01); *H02P 29/0241* (2016.02)

(56) References Cited

U.S. PATENT DOCUMENTS

| | | | |
|---|---|---|---|
| 5,650,901 A * | 7/1997 | Yamamoto | H01H 9/542 |
| | | | 361/100 |
| 5,953,189 A | 9/1999 | Abot et al. | |
| 6,111,377 A * | 8/2000 | Hertzog | H02P 1/28 |
| | | | 307/113 |
| 6,208,111 B1 * | 3/2001 | Williams | H02P 1/26 |
| | | | 318/362 |
| 2002/0093774 A1 | 7/2002 | Chung | |
| 2008/0225457 A1 | 9/2008 | Korrek | |
| 2008/0297089 A1 | 12/2008 | Fritsch et al. | |

FOREIGN PATENT DOCUMENTS

| | | |
|---|---|---|
| DE | 102004038111 A1 | 2/2006 |
| DE | 102005036777 A1 | 2/2007 |
| DE | 102012215329 A1 | 3/2014 |
| EP | 0806781 A1 | 11/1997 |
| EP | 1986316 A1 | 10/2008 |
| EP | 2237053 A1 | 10/2010 |

OTHER PUBLICATIONS

PCT International Search Report and Written Opinion of International Searching Authority dated Nov. 5, 2017 corresponding to PCT International Application No. PCT/EP2017/052324 filed Mar. 2, 1017.

\* cited by examiner

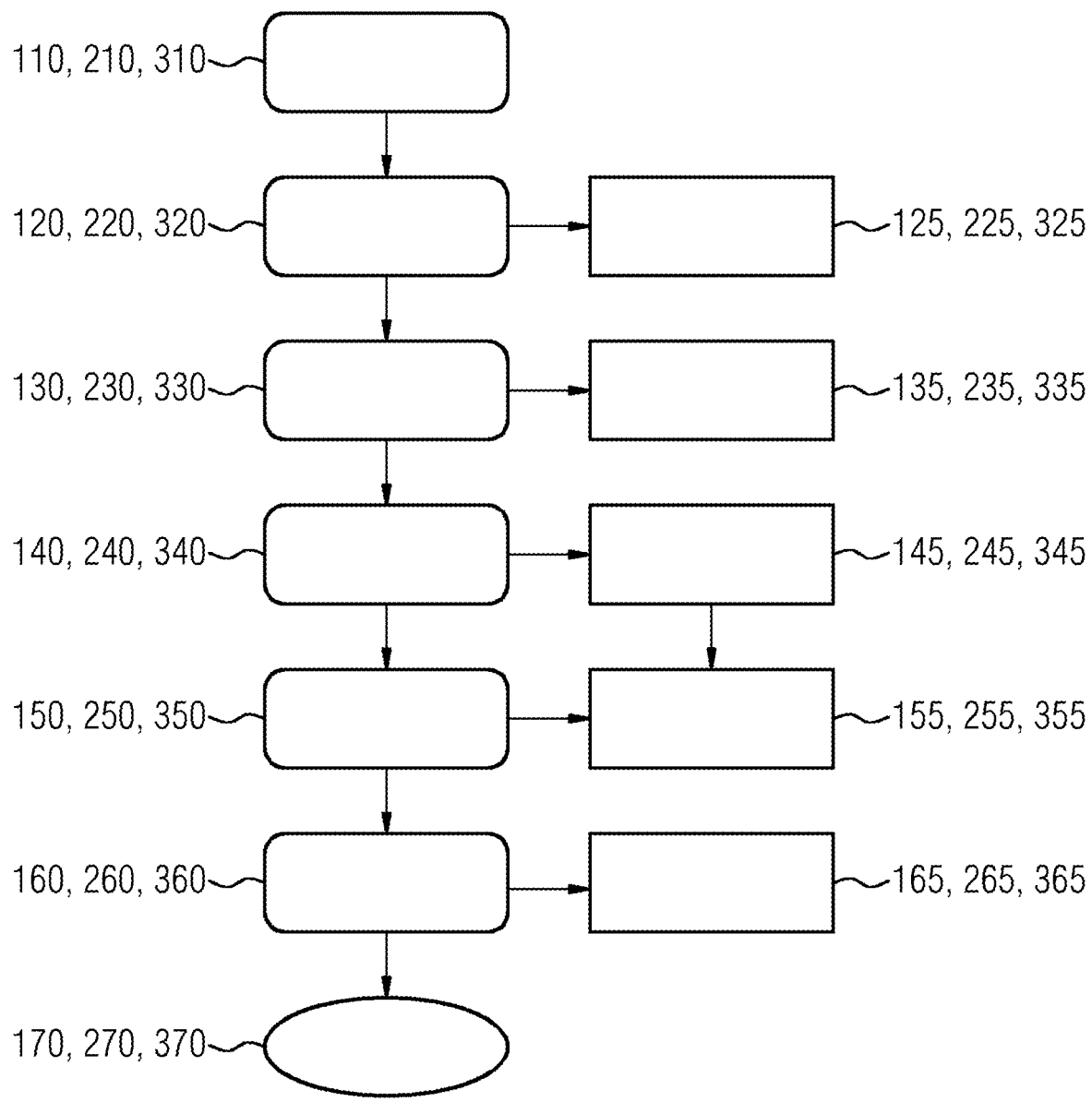

MOTOR STARTER AND DIAGNOSIS METHOD

CROSS REFERENCE TO RELATED APPLICATIONS

The present patent document is a § 371 nationalization of PCT Application Serial Number PCT/EP2017/052324, filed Feb. 3, 2017 designating the United States, which is hereby incorporated by reference in its entirety. This patent document also claims the benefit of DE 102016203755.2, filed on Mar. 8, 2016, which is also hereby incorporated by reference in its entirety.

FIELD

Embodiments relate to a motor starter and a diagnostic method that may be performed during the operation of the motor starter.

BACKGROUND

A control for an actuator is described in DE 40 08 002 A1 that is driven with three-phase alternating current. The actuator includes a motor and a fuse that is arranged in each of the three phases. Each of the phases also includes a bypass protection that is bridged by a semiconductor valve arrangement. There is also a reversing contactor in the phases that provides switching between right and left-hand rotation. A current measuring device is also provided between the reversing contactor and the bypass protection for each phase that detects the motor current in the respective phase.

DE 10 2005 36 777 A1 discloses a three-phase output stage with a reversing contactor circuit that is connected to two phases. In two of the phases one relay each is also connected, that is bridged by a semiconductor switching element. Two relays connected in series are also arranged in a further phase.

These disclosures require a high number of components to provide a sufficient level of operational safety. In addition, the circuits may only be applied to different types of motor, for example, one-phase and multi-phase driven electric motors, in a time-consuming manner. Due to the high level of complexity of the known solutions, automatic self-diagnosis of the circuits are only feasible with great effort. There is a need for a motor starter that may be adapted to different types of motor with minimum effort, provides a high level of operational safety and requires a reduced number of components for this purpose. There is further need for a diagnostic method that reliably permits differentiated fault identification for such a motor starter. The diagnostic method should be performed quickly and automatically and to integrate it into the operation of the motor starter without impairing the handling capability.

BRIEF SUMMARY AND DESCRIPTION

The scope of the present invention is defined solely by the appended claims and is not affected to any degree by the statements within this summary. The present embodiments may obviate one or more of the drawbacks or limitations in the related art.

Embodiments provide a motor starter. The motor starter is connected to a power supply by way of which an electric motor controlled by the motor starter is driven. The motor starter includes a first and a second phase in which a switching apparatus is arranged respectively. The switching apparatuses are configured to interrupt, e.g. to open, and to close the respective phase in a targeted manner. The switching apparatuses are each configured as a combination of an electromechanical switch and a semiconductor switch. The switching apparatuses are arranged in a bypass circuit such that the semiconductor switch and the electromechanical switch bridge each other. The switching apparatuses are configured such that a current flow in the respective phase is provided if at least the semiconductor switch or the electromechanical switch are closed. In the switching apparatuses, the electromechanical switches and the semiconductor switches are individually connected to a control unit of the motor starter. The individual connections provide that each electromechanical switch that, for example, may be configured as a relay, and each semiconductor switch that, for example, may be configure as a thyristor or triac, is separately controllable, e.g., operable, by the control unit. The separate controllability of the components of the switching apparatuses provides a precisely timed and technically differentiated activation of the switching apparatuses.

In an embodiment the motor starter is supplied with passive overcurrent protection in the first and second phase. A passive overcurrent protection is a safety measure against current intensities in phases that may lead to damage to the electric motor. The overcurrent protection includes components such as, for example, fuses that without the intervention of further components automatically bring about a safe operating state. A safe operating state refers to, for example, an interruption of the power supply of the electric motor before damage occurs. In an embodiment, the passive overcurrent protection includes a first fuse in the first phase and a second fuse in the second phase.

In the motor starter, a measuring apparatus for measuring the current intensity in the respective phase is arranged in at least one of the phases. The at least one measuring apparatus is arranged in at least one of the phases along the phase direction between the passive overcurrent protection and one of the switching apparatuses. In at least one of the phases of the passive overcurrent protection, the at least one measuring apparatus and the associated switching apparatus are connected in series. Along the phase direction refers to along the current flow of the power supply to the electric motor under normal conditions, e.g. in the case of at most negligible current flow between the phases, for example, by way of an overvoltage protector with varistors.

An embodiment of the at least one measuring apparatus permits the automatic performance of a differentiated diagnosis of the motor starter by a correspondingly selected switching sequence upon activation or deactivation of the electric motor. Switching states may be produced in which, based on the presence or absence of a current flow, it is not only generally possible to determine an error in the operating sequence. Rather, an accurate diagnosis is possible by which a defect in an individual component, e.g. of a semiconductor switch, or a manageable number of components is recognizable. The motor starter uses a small number of components and at the same time offers an increased range of functions.

The diagnostic function provides for the use of the motor starter for technical applications with high safety requirements. Furthermore, the motor starter is suitable for use both in three-phase as well as one-phase electric motors. In addition, the motor starter may be configure as a direct starter or reversing starter. As a result, an enlarged potential range of use is achieved. Furthermore, the motor starter realizes the principle of 2-out-of-3 redundancy, or 2oo3 redundancy for short. Due to the small number of components, only a reduced number of possible switching states may be present in the claimed motor so that with 1oo2 redundancy a high degree of operational safety may be achieved.

In an embodiment, at least one of the switching apparatuses includes a continuously operating current limit that corresponds to an intended operating current of the electric motor. The correspondence is to be understood as an essential equity considering technically customary production and measurement tolerances. The electromechanical switch may be provided for the continuous operation of the electric motor, so that the latter is dimensioned towards the continuously operating current limit. The switching apparatus includes reduced design reserves in the engine starter compared to the intended continuous operation. As a result, increased component utilization is achieved and the overall efficiency of the motor starter increased. The motor starter consequently uses simpler, smaller components that are more cost-effective at the same time.

Further preferably, at least one of the fuses in the passive overflow protection is dimensioned such that in the event of a reference current intensity, it includes a triggering duration that corresponds to a reaction time of one of the switching apparatuses. The reaction time of a switching apparatus is the time that elapses from detecting an overcurrent event until a suitable countermeasure is taken, in other words, opening the switching apparatus. The reaction time includes, inter alia, the switching time of the switching apparatus, for example, of the associated electromechanical switch. Consequently, the reference current intensity forms the limiting case in which the switching apparatus responds to an overcurrent event in one of the phases just as quickly as the associated fuse. Further preferably, the corresponding switching apparatus is configured to withstand the reference current intensity for the length of the reaction time. The reaction times range from 5 ms to 25 ms, preferably from 10 ms to 20 ms, further preferably from 13 ms to 17 ms, for example, 15 ms. Such times require only slight oversizing compared to the continuously operating current limit. As a result, a further increased exploitation of the components used is achieved in the fuses. Thus, two types of overcurrent event may exist in the claimed motor starter. The first type is a so-called subcritical overcurrent event in which the current intensity is below the reference current intensity and first one of the switching apparatuses interrupts the current flow of the power supply in the respective phase. The second type is a so-called supercritical overcurrent event in which the current intensity is above the reference current intensity and the fuse interrupts the current flow in the corresponding phase. The overlap area between both types is minimized so that here too a high utilization of the component is achieved. The solution uses a surprisingly simple parameter with the appropriate adapted dimensioning of the fuse, considering a switching apparatus to provide a motor starter that offers a high degree of safety with a reduced number of components and is simple and economical to manufacture at the same time.

The motor starter may be configured such that in the first phase a first measuring apparatus is arranged and in the second phase, a second measuring apparatus. The use of two measuring apparatuses also provides a detailed diagnostic option for three-phase electric motors, in other words, motor starters that switch all three phases. The configuration makes it possible to dispense with an additional third measuring apparatus and to restrict the functional scope of the motor starter.

In a further embodiment, the motor starter is provided with a reversible switching device in two phases, for example, the second and a third phase. With the reversible switching device, the motor starter forms a reversing starter. The reversible switching device includes two reversing relays and two direct relays. The reversing relays and direct relays are connected to two phases such that the relays are specifically interchangeable. The reversing relays and the direct relays are connected to the control unit of the motor starter and separately controllable and operable. The reversing relays and direct relays are controllable in a functionally coordinated manner such that the electric motors are controllable between clockwise rotation, anti-clockwise rotation and standstill, e.g., power interruption. The configuration of the motor starter is therefore suitable for the most widespread types of motor starters. The claimed motor starter may thus be manufactured with minimal adaptation effort in different variants. As a result, the motor starter is cost-effective in production.

The underlying object is also achieved by the diagnostic method for a motor starter described hereinafter. The claimed diagnostic method is suitable for a motor starter according to the one of the embodiments described above that is configured as a direct starter. Furthermore, the electric motor includes a three-phase design in this case and is provided to drive a mechanical load. The diagnostic method takes place during an activation sequence of the motor starter. At act a), the motor starter is provided in an inactive state. In the inactive state, all the switchable components of the motor starter, in other words, for example, semiconductor switches and electromechanical switches, are in an open state. At act b), the first phase is closed with a first electromechanical switch. As a result of the bypass circuit in the switching apparatus, in the first phase a conductive connection from the power supply to the electric motor is present. At act c), the first phase is reopened and the third phase closed with a third electromechanical switch. In act c), the conductive connection along the first phase is interrupted again and a conductive connection established between the power supply and the electric motor in the third phase. At act d), a first semiconductor switch in the first phase and a second semiconductor switch in the second phase are closed. Closing takes place by active control. Active control refers to any form of activation in which the corresponding semiconductor switch establishes a conductive connection in the corresponding phase using electrical energy. With the loss of the electrical energy used, and thus of active control, the semiconductor switch returns to a state in which a conductive connection no longer exists in the corresponding phase.

At act e), the first electromechanical switch closes in the first phase and the second electromechanical switch in the second phase. At act step f) the active control of the semiconductor switches is rejected and the latter return to an open state. As a result of the bypass circuit between the semiconductor switches and the electromechanical switches, in normal operation a conductive connection continues to exist in the first and second phase. The outlined actuations of the electromechanical switches and the semiconductor switches are triggered by the control unit of the motor starter. During the activation sequence described, the electric motor is put into operation.

Accordingly, the first and second measuring apparatus are arranged in the first and second phase of the motor starter and are configured to measure current flows in the respective phase and to report the associated measurement data to the control unit. Based thereon, the presence of a current flow in the respective phase may be recognized by the control unit.

Whether a current flow must be present or not is clearly defined at each stage of the activation sequence, in the normal fault-free, state of the motor starter. A deviation constitutes a fault in the motor starter detectable by the control unit.

In the method, a fault in the motor starter is detected if, when closing the electromechanical switch at act b), in the first and/or second phase a current flow is detected by at least one of the measuring apparatuses. A defect in the second electromechanical switch or the second semiconductor switch in the second phase, or a defect in the third electromechanical switch in the third phase is detectable. In addition, or alternatively, in the diagnostic method a fault in the motor starter is detected if a current flow is recorded at act c) after closing the third electromechanical switch in the third phase by at least one of the measuring apparatuses in the first and/or second phase. A defect in the first electromechanical switch or the first semiconductor switch is detected in the first phase.

In addition, or alternatively, in the method a fault in the motor starter is detected if, after closing the semiconductor switch at act d), in the first and/or second phase a current flow of zero is recorded by at least one of the measuring apparatuses. A current flow of zero refers to a current flow that is too low in terms of amount for the operation of the electric motor and not attributable to a technical defect in the motor starter. Measurement tolerances are to be used for detecting the current flow of zero.

Embodiments further provide a diagnostic method that may also be performed in a motor starter described in more detail above, that is configured as a reversing starter. The motor starter includes a three-phase design and is connected to a three-phase electric motor that is provided to drive a mechanical load.

The diagnostic method takes place in the course of an activation sequence of the motor starter. In a method, at act a), the motor starter is provided in an inactive state. In the inactive state, all the switchable components of the motor starter, hence for example, semiconductor switches and electromechanical switches, reversing relays and direct relays, are in an open state. At act b), the first phase is closed with a first semiconductor switch. Closing takes place by active control of the semiconductor switch. As a result of the bypass circuit in the switching apparatus, there are thus conductive connections from the power supply to the electric motor in the first and second phase. At act c), the first and second semiconductor switches are reopened. Likewise, in the reversible switching device the reversing relays or the direct relays that are connected in the second and the third phase are closed. A conductive connection is established between the power supply and the electric motor in the third phase. At act d), the first semiconductor switches in the first phase and the second semiconductor switches in the second phase are closed again. Closing also takes place by active control.

At act e), the first electromechanical switch is closed in the first phase and the second electromechanical switch is closed in the second phase. At act f), the active control of the semiconductor switches is rejected and the latter return to an open state. As a result of the bypass circuit between the semiconductor switches and the electromechanical switches, in normal operation a conductive connection continues to exist in the first and second phase. The outlined actuations of the electromechanical switches and the semiconductor switches are triggered by the control unit of the motor starter. In the course of the activation sequence described, the electric motor is put into operation.

Accordingly, the first and second measuring apparatus are arranged in the first and second phase of the motor starter and are configured to measure current flows in the respective phase and to report the associated measurement data to the control unit. Based thereon, the presence of a current flow in the respective phase may be recognized by the control unit. Whether a current flow must be present or not is defined at each stage of the activation sequence, in the normal, that is to say, fault-free, state of the motor starter. A deviation herefrom constitutes a fault in the motor starter detectable by the control unit.

In the method a fault in the motor starter is detected if, when closing the semiconductor switch at act b), in the first and/or second phase a current flow of zero is detected by at least one of the measuring apparatuses. A defect in one of the reversing relays or one of the direct relays in the second and/or third phase is detected. In addition, or alternatively, in the diagnostic method a fault in the motor starter is detected if a current flow is recorded at act c) after opening the reversible switching device by at least one of the measuring apparatuses in the first and/or second phase. A defect in the first and/or second electromechanical switch or the first and/or second semiconductor switch is detected in the first and/or second phase.

In addition, or alternatively, in the method a fault in the motor starter is detected if, after closing the semiconductor switch at act d), in the first and/or second phase a current flow of zero is recorded by at least one of the measuring apparatuses. A current flow of zero refers to a current flow that is too low in terms of amount for the operation of the electric motor and not attributable to a technical defect in the motor starter. The usual measurement tolerances are to be used for detecting the current flow of zero.

The diagnostic method requires an activation sequence with a reduced number of steps and at the same time provides the opportunity to locate or at least narrow down the fault in the motor starter, for example, defects in components. The diagnostic method uses relatively simple measurement data to identify whether a current flow exists or not. A resolution of the measurement data that is exact in terms of absolute value may be dispensed with. Furthermore, all variants of the diagnostic method may be programmed into a control unit of the motor starter by corresponding software. By a parameterization of the motor starter, the corresponding variant of the diagnostic method may be selected. The software requires only low storage and computing effort and may therefore also be implemented on hardware, for example microcontrollers, with little computing power. Furthermore, the diagnostic method may be executed in both outlined variants in a period of up to 150 ms, for example, of up to 100 ms, or up to 85 ms. Such a rapid diagnosis may be performed without impairing the operation of the motor starter each time the motor starter is activated. As a result of a continuous diagnosis of the motor starter that is possible therewith, a high degree of safety is achieved. The localization of faults in the motor starter also simplifies its repair. Overall, a robust diagnostic method that may be performed automatically and is differentiated is made available that is implemented on motor starters with low hardware complexity.

In an embodiment, a defect in the first or second semiconductor switch is detected at acts d) and e) on the basis of measurement results in the first and second phase. At act d), after closing the semiconductor switch, a current flow is recorded in the first and/or second phase. Furthermore, at act e), after closing the electromechanical switch by the at least one measuring apparatus, a current flow of zero is recorded.

Alternatively, in the diagnostic method it is possible to record when no electrical load is connected. Such freedom from an electrical load is evaluated by the at least one measuring apparatus at acts d) and e). After closing the semiconductor switch, at act d) a current flow of zero is initially recorded. Furthermore, after closing the electromechanical switch, at act e) a current flow of zero is also recorded by the at least one measuring apparatus in the first and second phase. The method thus permits a further differentiated diagnosis of the state of the motor starter both in the case of reversing starters and direct starters. As a result, a larger number of cases of faults may be automatically detected, thus ensuring an increased degree of operational safety.

In an embodiment, a defect in the first and/or second electromechanical switch is detected if at act f) at least one of the measuring apparatuses records a current flow of zero. The detection also further enhances the possibility of fault diagnosis.

Embodiments provide the diagnostic method described in more detail hereinafter. The motor starter is configured as a direct starter that is connected to a single-phase electric motor with which a mechanical load is to be driven.

The diagnostic method takes place in the course of an activation sequence of the motor starter. At act a), the motor starter is made available in an inactive state. In the inactive state, all the switchable components of the motor starter, for example, semiconductor switches and electromechanical switches are in an open state. At act b), the first phase is closed with a first electromechanical switch. As a result of the bypass circuit in the switching apparatus, in the first phase there is a conductive connection from the power supply to the electric motor. At act c), the first phase is repeated. At act d), a first semiconductor switch is closed in the first phase and a second semiconductor switch in the second phase. Closing takes place by active control here. Active control is understood to mean any form of actuation in which the corresponding semiconductor switch establishes a conductive connection in the corresponding phase using electrical energy. In the event of the loss of the electrical energy, and thus the active control, the semiconductor switch returns to a state in which a conductive connection no longer exists in the corresponding phase.

At act e), the first electromechanical switch is closed in the first phase and the second electromechanical switch is closed in the second phase. At act f) the active control of the semiconductor switches is rejected and the latter return to an open state. As a result of the bypass circuit between the semiconductor switches and the electromechanical switches, in normal operation a conductive connection continues to exist in the first and second phase. The outlined actuations of the electromechanical switches and the semiconductor switches are triggered by the control unit of the motor starter. During the activation sequence described, the electric motor is put into operation.

Accordingly, the first and second measuring apparatus are arranged in the first and second phase of the motor starter and are configured to measure current flows in the respective phase and to report the associated measurement data to the control unit. Based thereon, the presence of a current flow in the respective phase may be recognized by the control unit. Whether a current flow must be present or not is clearly defined at each stage of the activation sequence, in the normal, that is to say, fault-free, state of the motor starter. A deviation herefrom constitutes a fault in the motor starter detectable by the control unit.

In the method, a fault in the motor starter is detected if, when closing the electromechanical switch at act b), in the first and/or second phase a current flow is detected by at least one of the measuring apparatuses. A defect in the second electromechanical switch or the second semiconductor switch is detectable in the second phase. In addition, or alternatively, in the diagnostic method a fault in the motor starter is detected if a current flow is detected at act c) after closing the third electromechanical switch in the third phase by at least one of the measuring apparatuses in the first and/or second phase. A defect in the first electromechanical switch or the first semiconductor switch is detected in the first phase.

In addition, or alternatively, in the method a fault in the motor starter is detected if a current flow of zero is detected after closing the semiconductor switch at act d) by at least one of the measuring apparatuses in the first and/or second phase. A current flow of zero refers to a current flow that is too low in terms of amount for the operation of the electric motor and not attributable to a technical defect in the motor starter. Normal measurement tolerances are to be used for detecting the current flow of zero.

In an embodiment, a defect in the first or second semiconductor switch is detected on the basis of measurement results in the first and second phase in the steps d) and e). In step d), after closing the semiconductor switch, a current flow of zero is initially recorded in the first and/or second phase. Furthermore, in step e) a current flow is detected after closing the electromechanical switch by the at least one measuring apparatus.

Alternatively, in the diagnostic method it is possible to record if no electrical load is connected. Such freedom from an electrical load is evaluated by the at least one measuring apparatus at acts d) and e). After closing the semiconductor switch, at act d) a current flow of zero is initially recorded. Furthermore, after closing the electromechanical switch, at act e) a current flow of zero is also recorded by the at least one measuring apparatus in the first and second phase. The method thus permits a further differentiated diagnosis of the state of the motor starter both in the case of reversing starters and direct starters. As a result, a larger number of cases of faults may be automatically detected, thus providing an increased degree of operational safety.

In a further embodiment, a defect in the first and/or second electromechanical switch is detected at act f) if at least one of the measuring apparatuses records a current flow of zero after the rejection of the active control of the semiconductor switch. The detection also further enhances the possibility of fault diagnosis.

BRIEF DESCRIPTION OF THE FIGURES

FIG. 4 depicts a diagrammatic view of the sequence of the diagnostic method according to an embodiment.

DETAILED DESCRIPTION

Figure 1:
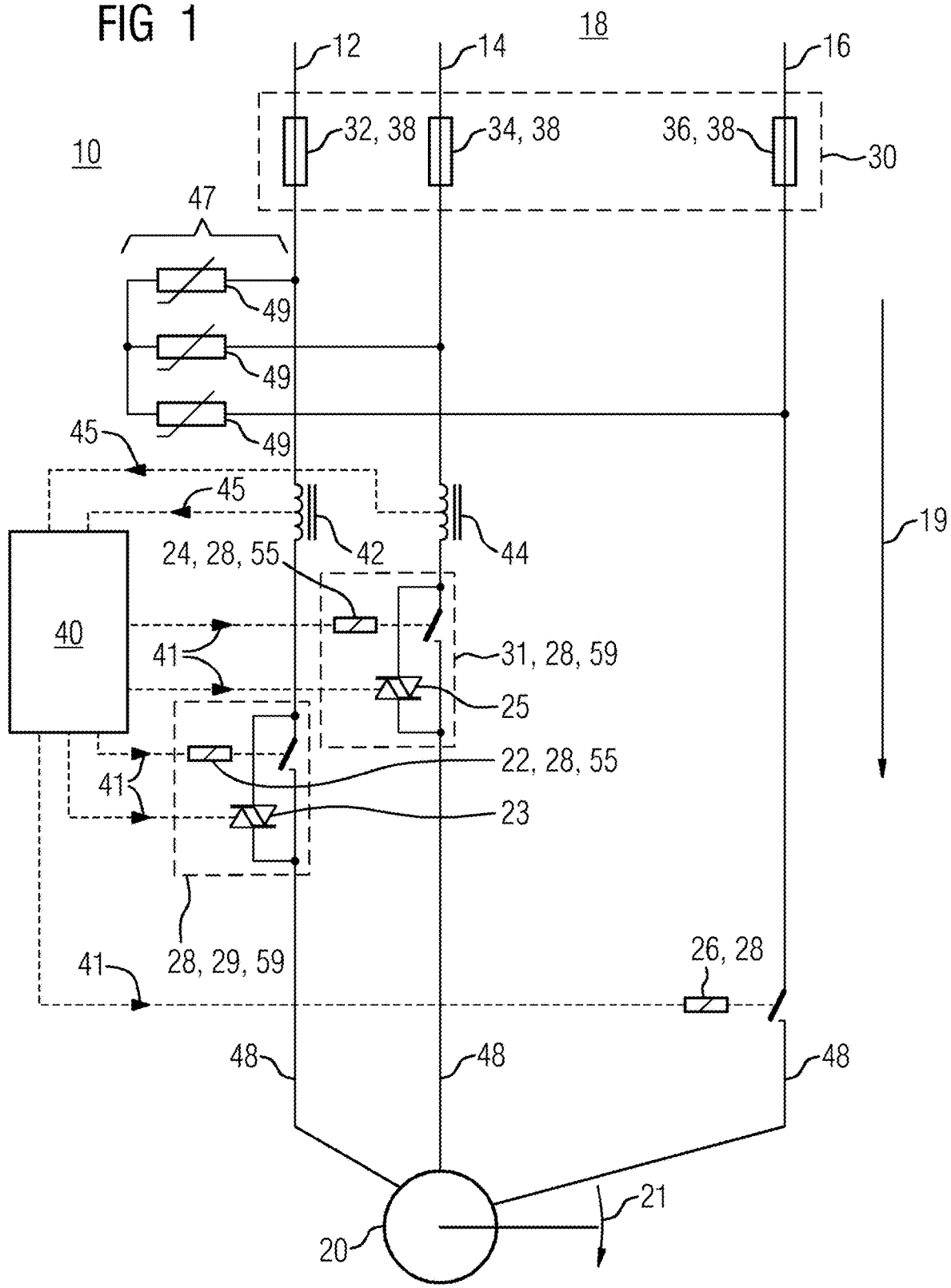
FIG. 1 depicts a diagrammatic view of the structure of an embodiment of the motor starter.

FIG. 1 depicts a diagrammatic view of a motor starter 10 that is configured as a direct starter for driving a three-phase electric motor 20. The electric motor 20 is used to drive a mechanical load 21 and is supplied by a power supply 18 not shown in more detail. The motor starter 10 includes a first, a second and a third phase 12, 14, 16 that are provided with a passive overcurrent protection 30. The passive overcurrent protection 30 includes a first, second and third fuse 32, 34, 36 that are configured for a reference current intensity 38. An overvoltage protector 47 with several coupled varistors 49 is also arranged in the motor starter 20. The varistors 49 branch off from the phases and carry no current in normal operation. In addition, in the first phase 12 a first switching apparatus 29 is provided in the motor starter 20 according to FIG. 1.

The first switching apparatus 29 includes a first electromechanical switch 22 and a semiconductor switch 23 that are arranged in a bypass circuit. In this way, a conductive connection may be produced along a phase direction 19 in the first phase 12. The first electromechanical switch 22 serves to permanently transmit the intended operating current 48 present in the first phase 12. The first electromechanical switch 22 is configured such that the switch 22 includes a continuously operating current limit 28 that corresponds to the intended operating current 48. As a result, the first electromechanical switch 22 includes reduced capacity reserves compared to the continuously operating state. Furthermore, the first electromechanical switch 22 includes an actuation time 55 that is to be understood as the time that elapses between the receipt of a control command 41 from a control unit 40 of the motor starter 10 and the completed implementation of the switching command 41. The first electromechanical switch 22 is slower than the first semiconductor switch 23 and therefore defines the reaction time 59 of the first switching apparatus 29.

A second switching apparatus 31 is arranged in the second phase 14 having a second electromechanical switch 24 and a second semiconductor switch 25. The second switching apparatus 31 corresponds to the first switching apparatus 29 in terms of structure and functionality such that the same reference characters also have the same meaning on the second switching apparatus 31.

A third electromechanical switch 26 is arranged in the third phase 16 that is configured like the first and second electromechanical switch 22, 24 as regards a continuously operating current limit 28. The third electromechanical switch 26 is also operable separately by the control unit 40 by way of control commands 41. In addition, a measuring apparatus 42, 44 is arranged in the first and second phase 12, 14 respectively that is configured to record the current intensity in the respective phases 12, 14. Viewed along the phase direction 19, the first measuring apparatus 42 in the first phase 12 is positioned directly between the first fuse 32 and the first switching apparatus 29. In the second phase 14, the second measuring apparatus 44 is arranged in an analogous manner and, viewed along the phase direction 19, is located directly between the second fuse 34 and the second switching apparatus 31. Both measuring apparatuses 42, 44 are connected to the control unit 40 and transmit the recorded current intensities to the control unit 40 as measurement data 45.

With activation of the motor starter 10 by sequential adjustment of certain switching states, the structure according to FIG. 1 permits a differentiated diagnosis of the motor starter 10. Furthermore, by way of the structure from FIG. 1, a motor starter 10 with a reduced number of components is realized that implements the principle of a 2-out-of-3 redundancy, 2oo3 redundancy for short. The motor starter 10 therefore offers a precise diagnostic option with a high level of reliability at the same time and a simple and cost-effective design for the three-phase electric motor 20.

Figure 2:
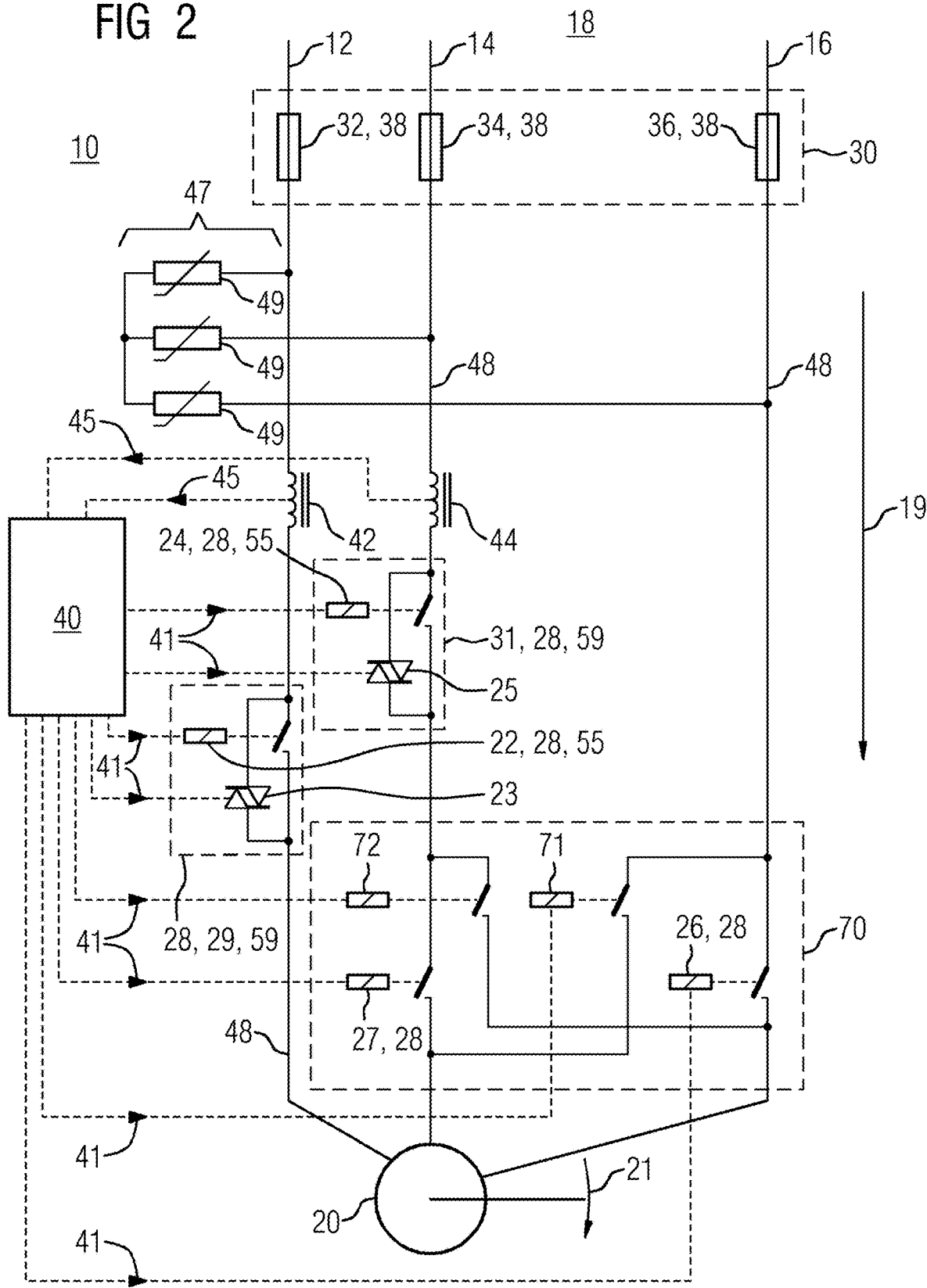
FIG. 2 depicts a diagrammatic view of the structure of an embodiment of the motor starter.

FIG. 2 depicts a diagrammatic view of the structure of a second embodiment of the motor starter 10 that is configured as a reversing starter. The electric motor 20 is used to drive a mechanical load 21 and is supplied by a power supply 18 not shown in more detail. The motor starter 10 includes a first, a second and a third phase 12, 14, 16 that are provided with a passive overcurrent protection 30. The passive overcurrent protection 30 includes a first, second and third fuse 32, 34, 36 that are configured for a reference current intensity 38. An overvoltage protector 47 with several coupled varistors 49 is also arranged in the motor starter 20. The varistors 49 branch off from the phases and do not carry any current in normal operation. In addition, a first switching apparatus 29 is provided in the motor starter 20 according to FIG. 2 in the first phase 12.

The first switching apparatus 29 includes a first electromechanical switch 22 and a semiconductor switch 23 that are arranged in a bypass circuit. As a result, a conductive connection may be produced along a phase direction 19 in the first phase 12. The first electromechanical switch 22 serves to permanently transmit the intended operating current 48 present in the first phase 12. The first electromechanical switch 22 is dimensioned such that the electromechanical switch 22 includes a continuously operating current limit 28 that corresponds to the intended operating current 48. As a result, the first electromechanical switch 22 includes reduced capacity reserves compared to the continuously operating state. Furthermore, the first electromechanical switch 22 includes an actuation time 55 that is the time that elapses between the receipt of a control command 41 from a control unit 40 of the motor starter 10 and the completed implementation of the switching command 41. The first electromechanical switch 22 is slower than the first semiconductor switch 23 and therefore defines the reaction time 59 of the first switching apparatus 29.

A second switching apparatus 31 is arranged in the second phase 14 including a second electromechanical switch 24 and a second semiconductor switch 25. The second switching apparatus 31 corresponds to the first switching apparatus 29 in terms of structure and functionality such that the same reference characters also have the same meaning on the second switching apparatus 31.

In addition, in FIG. 2 a reversible switching device 70 is arranged in the second and third phase 14, 16 that is configured to adjust a clockwise rotation or an anti-clockwise rotation in the electric motor 20. The reversible switching device 70 includes a first reversing relay 71 and a second reversing relay 72 by way of which the second phase 14 may be connected to the third phase 16. Likewise, the reversible switching device 70 includes a first and a second electromechanical switch that are configured as first and second direct relays 26, 27. The first direct relay 26 corresponds to the third electromechanical switch 28 from FIG. 1 in terms of structure and functionality. The first and second direct relays 26, 27 each have a continuously operating current limit 28 that corresponds to the operating current 48 present in normal operation in the three phases 12, 14, 16. The direct relays 26, 27 and the reversing relays 71, 72 are separately operable by the control unit 40 by way of switching commands 41. The operation of the direct relays 26, 27 and the reversing relays 71, 72 is coordinated such that the direct relays 26, 27 and the reversing relays 71, 72 are controlled in pairs. When switching between clockwise and anti-clockwise rotation, one of the relay pairs is first opened and then the other closed. Furthermore, the current flow in the second and third phase 12, 14 may be interrupted by opening both relay pairs.

In addition, a measuring apparatus 42, 44 is arranged in the first and second phase 12, 14 respectively and is configured to record the current intensity in the respective phases 12, 14. Viewed along the phase direction 19, the first measuring apparatus 42 in the first phase 12 is positioned directly between the first fuse 32 and the first switching apparatus 29. The second measuring apparatus 44 is arranged in an analogous manner in the second phase 14 and, viewed along the phase direction 19, is located directly between the second fuse 34 and the second switching apparatus 31. Both measuring apparatuses 42, 44 are connected to the control unit 40 and transmit the recorded current intensities to the control unit 40 as measurement data 45.

With activation of the motor starter 10 by sequential adjustment of certain switching states, the structure according to FIG. 2 permits a differentiated diagnosis of the motor starter 10. Furthermore, by way of the structure from FIG. 2, a motor starter 10 with a reduced number of components is realized that implements the principle of a 2-out-of-3 redundancy, 2oo3 redundancy for short. The motor starter 10 therefore offers a precise diagnostic option with a high level of reliability at the same time and a simple and cost-effective design for the three-phase electric motor 20.

Figure 3:
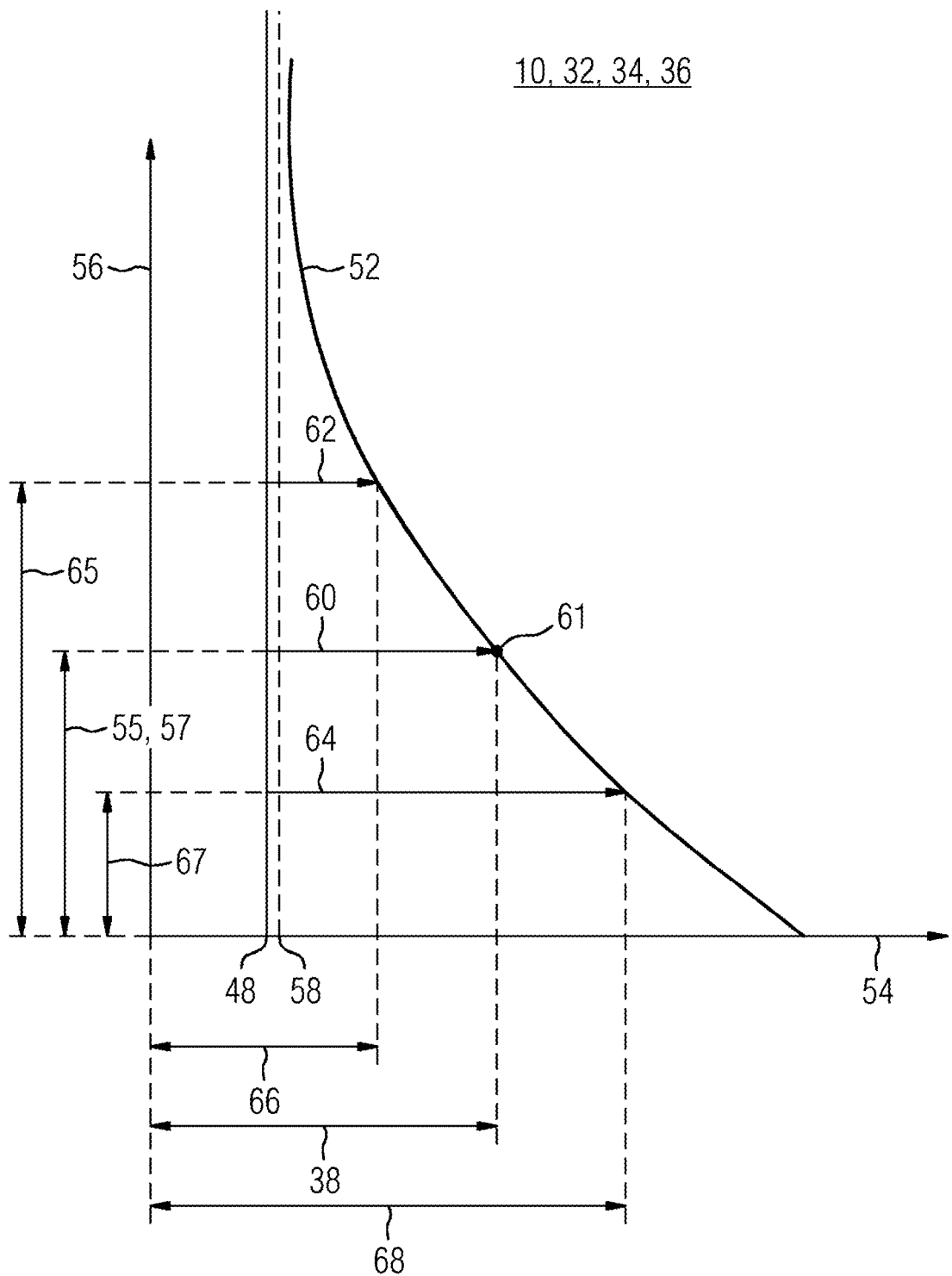
FIG. 3 depicts a characteristic curve diagram of a fuse of the passive overcurrent protection according to an embodiment.

FIG. 3 depicts a characteristic curve diagram of a fuse 32, 34, 36 in the motor starter 10, as shown in FIG. 1 or 2, for example. In FIG. 3 the horizontal axis depicts the current intensity 54 that flows through the fuse 32, 34, 36 considered. The vertical axis shows the actuation time 56 in which the fuse 32, 34, 36 reacts if the respective current intensity 54 is present. To provide a better overview, the diagram is shown double logarithmically. FIG. 3 depicts the operating current 48 that flows through the fuse 32, 34, 36 in normal operation as a vertical line. The operating current 48 is below a triggering minimum 58. Below the triggering minimum 58, the fuse 32, 34, 36 does not react. The characteristic curve 52 includes a triggering duration 57 for a reference current intensity 38, a design point 61 is characterized. In the design point 61, the actuation time 57 corresponds to a reaction time 55 of a switching apparatus 29, 31 not shown in more detail of the motor starter 10. In the design point there is therefore a reference overcurrent event 60 to which the fuse 32, 34, 36 reacts just as quickly as the switching apparatus 29, 31 not shown. This is configured to withstand the reference current intensity 38 in the design point 55 at least or precisely for the triggering duration 57 and/or the reaction time 55.

In a so-called subcritical overcurrent event 62, a subcritical current intensity 66 is present in the fuse 32, 34, 36 in which the triggering duration 65 exceeds the reaction time 55. The switching apparatus 29, 31 reacts first, rendering a further measure by the fuse 32, 34, 36 unnecessary.

In the event of a so-called supercritical overcurrent event 64, there is an increased current intensity 68 compared to the reference overcurrent event 60. The resulting triggering duration 67 is shorter than the triggering duration 57 in the reference case and/or than the reaction time 55 of the switching apparatuses 29, 31. In a supercritical overcurrent event 64, there is first a countermeasure by the fuse 32, 34, 36, rendering the further behavior of the switching apparatus 29, 31 unimportant.

FIG. 4 shows a flow chart for the diagnostic method 100, 200, 300 that may be implemented with the motor starter 10, as shown, for example, in FIGS. 1 and 2. In all three variants, a method step 110, 210, 310 takes place initially in which the motor starter 10 is provided in an inactive state. In the Inactive State, the motor starter 10 is intentionally in a switching state in which no current flows. In a subsequent second method step 120, 220, 320, the first phase 12 not shown in more detail is closed in the motor starter 10. The closure takes place in the first and third diagnostic method 100, 300 by a first electromechanical switch 22. In the second diagnostic method 200, the first phase 12 is with the first semiconductor switch 23. In addition, in the second method step 220 the second phase 14 is also closed with the second semiconductor switch 25. Thereupon, in the first and second phase 12, 14 the current flow is recorded by the measuring apparatuses 42, 44. If a current flow is recorded in one of the two phases 12, 14 in the second method step 120, 220, 320, then a fault is detected in the motor starter 20 in a first diagnostic step 125, 225, 325. In the first variant of the diagnostic method 100, in the first diagnostic step 125 a defect is diagnosed in the second electromechanical switch 24 in the second phase 14, in the third electromechanical switch 26 in the third phase 16, or at least in a semiconductor switch 23, 25. In the second diagnostic method 200, a defect in a reversing relay 71, 72 or direct relay 26, 27 is detected in the first diagnostic step 225. In the third diagnostic method 300, a defect in the second electromechanical switch 24 is detected in the second phase 14.

In a further method step 130, 230, 330, the first phase 12, 14 is reopened. In addition, in the first diagnostic method 100, 200 the third phase 26 is closed with the third electromechanical switch 26 in the third method step 130. In the second diagnostic method 200, in the third act 230 the reversible switching device 70, the reversing relays 71, 72 or the direct relays 26, 27 are closed, resulting in a conductive connection in the second and third phase 14, 16. The third act 130, 230, 330 is followed by a second diagnostic step 135, 235, 335 in which a fault in the motor starter 10 is detected if a current flow is detected in at least the first or second phase 12, 14. In the first and third diagnostic method 100, 300, a defect in the first electromechanical switch 22 or the first semiconductor switch 23 in the first phase 12 is recorded in the second diagnostic step 135, 335. In the second diagnostic method 200, one of the two semiconductors 23, 25 or one of the electromechanical switches 22, 24 in the first and/or second phase 12, 14 is recorded in the second diagnostic step 235.

Subsequently, a fourth act 140, 240, 340 in which the first and second semiconductor switches 23, 35 are closed takes place in the three variants of the diagnostic method 100, 200, 300. The semiconductor switches 23, 25 are closed by direct control. The fourth act 140, 240, 340 is followed by a third diagnostic act 145, 245, 345. If a current flow of zero is recorded in the third diagnostic act 145, 245, 345, a fault is detected in the motor starter 10. For closer identification of the fault, the fifth act 150, 250, 350 is then performed. Therein the first and second electromechanical switch 22, 24 are closed in the first and second phase 12, 14 and thereupon the current flow in the first and second phase 12, 14 recorded again. The result of the recording after the fifth method act 150, 250, 350 is taken into consideration in the fourth diagnostic act 155, 255, 355. If a current flow of zero is detected in the third diagnostic act 145, 245, 345 and in the fourth diagnostic act 155, 255, 355, the freedom of the electric motor 20 from an electrical load is detected. The mechanical load 21 to be driven is not connected to the electric motor 20.

If a current flow of zero is detected in the third diagnostic step 145, 245, 345 and a current flow is detected in the fourth diagnostic step 155, 255, 355, a defect in at least one semiconductor switch 23, 25 is identified.

In the three variants of the diagnostic method 100, 200, 300, a sixth method step 160, 260, 360 then follows in which the active control of the semiconductor switches 23, 25 is rejected, followed by a recording of the current flow in the first and second phase 12, 14 and an evaluation of the recording in the fifth diagnostic step 165, 265, 365. If a current flow of zero is recorded in the fifth diagnostic step 165, 265, 365, a defect in the first and/or second electromechanical switch 22, 24 is identified.

Upon identification of a fault, in the diagnostic methods 100, 200, 300 a warning is output by the control unit 40 based on programming and/or an additional safety measure taken. An additional safety measure may be to block the restarting of the motor starter 10.

After the sixth method step 160, 260, 360, in fault-free operation the motor starter 10 reaches its continuously operating state 170, 270, 370 in which the current is carried in all the phases 12, 14, 16 by way of the electromechanical switches 22, 24, 26 and/or the reversing relays 71, 72 or direct relays 26, 27.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A motor starter for an electric motor, the motor starter comprising:
   a first phase and a second phase;
   the first phase and the second phase each comprising an associated switching apparatus, each associate switching apparatus comprising an electromechanical switch and a semiconductor switch connected to form a bypass circuit;
   wherein the electromechanical switches and the semiconductor switches are configured to be separately operable by a control unit, wherein the first phase and the second phase are connected to a passive overcurrent protection device that comprises a first fuse for the first phase and a second fuse for the second phase; wherein a measuring apparatus is connected in at least one of the phases along a phase direction and positioned directly between the passive overcurrent protection device and at least one of the associated switching apparatuses.

2. The motor starter of claim 1, at least one of the associated switching apparatuses includes a continuously operating current limit that corresponds to an intended operating current.

3. The motor starter of claim 1, wherein at least one of the fuses a triggering duration at a reference current intensity corresponding to a reaction time of at least one of the associated switching apparatuses.

4. The motor starter of claim 3, wherein at least one of the associated switching apparatuses is configured to withstand the reference current intensity for the reaction time.

5. The motor starter of claim 1, wherein a first measuring apparatus is arranged in the first phase and a second measuring apparatus is arranged in the second phase.

6. The motor starter of claim 1, wherein in the first phase and the second phase a reversible switching device for interchanging the first phase and the second phase is connected.

7. A diagnostic method for a motor starter configured as a direct starter and connected to a three-phase electric motor, the method comprising:
   providing the motor starter in an inactive state;
   closing of a first phase with a first electromechanical switch;
   opening of the first phase and closing of a third electromechanical switch in a third phase;
   closing of a first semiconductor switch in the first phase and a second semiconductor switch in a second phase by active control of the first and second semiconductor switches;
   closing of a first electromechanical switch in the first phase and a second electromechanical switch in the second phase, wherein each of the first electromechanical switch and the second electromechanical switch form a bypass circuit with the first and second semiconductor switches;
   rejecting active control of the first and second semiconductor switches;
   wherein a fault in the motor starter detected when during closing of the first semiconductor switch in the first phase and closing of the second semiconductor switch in a second phase or opening of the first phase and closing of the third electromechanical switch in the third phase a current flow is detected by at least one measuring apparatus in the first phase, the second phase, or the first phase and second phase or when during closing of the first semiconductor switch in the first phase and closing of the second semiconductor switch in the second phase a current flow of zero is detected by-the at least one measuring apparatus in the first phase, the second phase, or the first phase and the second phase.

8. A diagnostic method for a motor starter configured as a reversing starter and connected to a three-phase electric motor, the method comprising:
   providing the motor starter in an inactive state;
   closing of a first semiconductor switch in a first phase and closing of a second semiconductor switch in a second phase;
   opening of the first and the second semiconductor switch and closing of a reversible switching device or a direct switching device in the second and a third phase;
   closing of the first and second semiconductor switch;
   closing of a first electromechanical switch in the first phase and a second electromechanical switch in the second phase that each form a bypass circuit with the first and second semiconductor switches;
   rejecting of active control of the semiconductor switches;
   wherein a fault in the motor starter is detected when during closing or opening of the first semiconductor switch a current flow is detected by at least one measuring apparatus in the first phase, the second phase, or the first phase and the second phase or when during closing of the first and second semiconductor switches a current flow of zero is detected in the first phase, the second phase, or the first phase and the second phase by the at least one measuring apparatus.

9. The diagnostic method of claim 7, wherein a defect in the first or second semiconductor switch is detected if during closing of the first semiconductor switch in the first phase and closing of the second semiconductor switch in the second phase a current flow of zero is detected, and closing of the first electromechanical switch in the first phase and closing of the second electromechanical switch in the second phase current flow is detected by the at least one measuring apparatus.

10. The diagnostic method of claim 7, wherein a freedom of the electric motor from an electrical load is detected if a current flow of zero is detected by the at least one measuring apparatus during closing of the first semiconductor switch in the first phase and closing of the second semiconductor switch in the second phase and during closing of the first electromechanical switch in the first phase and closing of the second electromechanical switch in the second phase.

11. The diagnostic method of claim 7, wherein a defect in the first or second electromechanical switch is detected if a current flow of zero is detected by the at least one measuring apparatus during rejecting of the active control of the first and second semiconductor switches.

12. A diagnostic method for a motor starter configured as a direct starter and connected to a single-phase electric motor, the method comprising:
    providing the motor starter in an inactive state;
    closing a first phase with a first electromechanical switch;
    opening the first phase;
    closing a first semiconductor switch in the first phase and a second semiconductor switch in a second phase by active control of the first and second semiconductor switches;
    closing a first electromechanical switch in the first phase and a second electromechanical switch in the second phase that each form a bypass circuit with the first and second semiconductor switches;
    rejecting the active control of the first and second semiconductor switches;
    wherein a fault in the motor starter is detected if when closing the first phase a current flow is detected by at least one measuring apparatus in the first phase, second phase, or first and second phase when closing the first semiconductor switch in the first phase and the second semiconductor switch in the second phase a current flow of zero is detected by the at least one measuring apparatus in the first phase, second phase, or first and second phase.

13. The diagnostic method of claim 12, wherein a defect in the first or second semiconductor switch is detected if a current flow of zero is detected when closing the first semiconductor switch in the first phase and the second semiconductor switch in the second phase and a current flow is detected by the at least one measuring apparatus when closing the first electromechanical switch in the first phase and the second electromechanical switch in the second phase.

14. The diagnostic method of claim 12, wherein the freedom of the electric motor from an electrical load is detected if a current flow of zero is detected by the at least one measuring apparatus when closing the first semiconductor switch in the first phase and the second semiconductor switch in the second phase and when closing the first electromechanical switch in the first phase and the second electromechanical switch in the second phase.

15. The diagnostic method of claim 12, wherein a defect in the first or the second electromechanical switch is detected if a current flow of zero is detected by the at least one measuring apparatus during rejecting the active control of the first and second semiconductor switches.

* * * * *

UNITED STATES PATENT AND TRADEMARK OFFICE
CERTIFICATE OF CORRECTION

Page 1 of 1

PATENT NO. : 10,873,279 B2
APPLICATION NO. : 16/077820
DATED : December 22, 2020
INVENTOR(S) : Karsten Ahnert et al.

It is certified that error appears in the above-identified patent and that said Letters Patent is hereby corrected as shown below:

On the Title Page

Item (74) Attorney, Agent, or Firm:
"Lernpia Summerfield Katz, LLC"
Should be replaced with:
"Lempia Summerfield Katz, LLC"

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*